United States Patent [19]

Ichikawa et al.

[11] Patent Number: 5,195,127
[45] Date of Patent: Mar. 16, 1993

[54] RADIO TELEPHONE SYSTEM AND ITS CONTROL METHOD

[75] Inventors: Tomohisa Ichikawa, Fuchu; Koichi Ito, Hino, both of Japan

[73] Assignee: Kabushiki Kaisha Toshiba, Kawasaki, Japan

[21] Appl. No.: 724,470

[22] Filed: Jun. 27, 1991

Related U.S. Application Data

[63] Continuation of Ser. No. 408,249, Sep. 18, 1989, abandoned.

[30] Foreign Application Priority Data

Sep. 19, 1988 [JP] Japan .................. 63-234029

[51] Int. Cl.$^5$ .................. H04M 11/00; H04B 1/00
[52] U.S. Cl. .................. 379/58; 379/59; 379/63; 455/54.1; 455/56.1
[58] Field of Search .................. 379/56, 57, 58, 59, 379/61, 62, 63, 88, 243

[56] References Cited

U.S. PATENT DOCUMENTS

| | | | |
|---|---|---|---|
| 3,894,194 | 7/1975 | Frost | 379/63 |
| 4,144,496 | 3/1979 | Cunningham et al. | 379/60 |
| 4,233,473 | 11/1980 | Frost | 379/59 |
| 4,574,164 | 3/1986 | Orikasa | 379/63 |
| 4,627,098 | 12/1986 | Dolikian et al. | 379/58 |
| 4,775,999 | 10/1988 | Williams | 379/59 |
| 4,829,554 | 5/1989 | Barnes et al. | 379/58 |
| 4,852,148 | 7/1989 | Shibata et al. | 379/59 |
| 4,872,204 | 10/1989 | Hammer et al. | 455/54 |
| 4,881,271 | 11/1989 | Yamauchi et al. | 455/56 |
| 4,918,746 | 4/1990 | Serizawa | 455/54 |
| 5,040,205 | 8/1991 | Kunihiro | 379/61 |
| 5,068,890 | 11/1991 | Nilssen | 379/90 |

FOREIGN PATENT DOCUMENTS

63-234029 9/1988 Japan .

OTHER PUBLICATIONS

Sony Corporation, "Cordless Telephone SPP-100" Jan. 1985.

*Primary Examiner*—Curtis Kuntz
*Assistant Examiner*—William Cumming
*Attorney, Agent, or Firm*—Finnegan, Henderson, Farabow, Garrett and Dunner

[57] ABSTRACT

A radio telephone system which is suitable when the number of radio telephone sets is relatively small, communication traffic is low, and the system must cover a wide communication area, and a method of controlling the system is disclosed. In the system, a plurality of base stations commonly connected to a wired line and at least one radio telephone set are provided and the position registration of the radio telephone set is carried out with respect to either one of the base stations so that when the system receives an incoming call from the wired line, a radio speech circuit is established between the position-registration base station and the radio telephone set. The position registration can be realized by depressing a particular key provided to the radio telephone set or by operating a keyboard or the like provided to a particular one of the base stations. Further, the base stations are respectively removably connected so that the radio zone of the system can be arbitrarily expanded or reduced as necessary.

10 Claims, 10 Drawing Sheets

RADIO TELEPHONE SYSTEM AND ITS CONTROL METHOD

This application is a continuation of application Ser. No. 07/408,249, filed Sep. 18, 1989, now abandoned.

BACKGROUND OF THE INVENTION

1. Field of the Invention

The present invention relates generally to radio telephone systems and their control methods, and more particularly, to radio telephone system which is suitable in such applications as in pastures or golf courses where a relatively small number of radio telephone sets are used to cover a wide communication area with a low communication traffic, and also to a method of controlling the system.

2. Description of the Prior Art

A radio telephone system of the type referred to is arranged as shown in FIG. 12 so that, as well known, L of wired telephone lines 1 (1A to 1L) are connected to a controller 2 which in turn is connected through N of connection cables 3 (3A to 3N) to N of connectors 4A to 4N, the connectors 4A to 4N being coupled through their radio communication circuits with M of radio telephone sets 5A to 5M, so that speeches or communications can be realized between the radio telephone sets 4A to 4M and the associated wired telephone lines 1A to 1L through the connectors 4A to 4N under control of controller 2.

With such an arrangement, if an incoming call to the radio telephone set 5A appears on, for example, the wired telephone line 1A, then the controller 2 sends the incoming signal to the connector 4A having a radio zone in which the radio telephone set 5A is present, to cause the connector 4A to call the associated radio telephone set 5A, so that when user of the radio telephone set 5A gives an off-hook response, the system can be put in its speech enable state. In this case, calling of the radio telephone set 5A from the connector 4A is realized by transmitting to the radio telephone set 5A an incoming-call signal in which a predesignated identification data (ID code) is contained.

The same explanation holds true for the case where a calling operation is performed at the radio telephone set 5A. That is, when the connector 4A receives a calling signal from the radio telephone set 5A, the connector 4A judges whether or not the identification data included in the received calling signal coincides with the identification data of the radio telephone set 5A itself. If the connector 4A finds an identification data coincidence, then it advances the subsequent line interconnection sequence to connect the radio telephone set 5A with the wired telephone line 1A.

In the case where the radio telephone set 5A is moved from the radio zone of the connector 4A into the new radio zone of, for example, connector 4B, the radio telephone set 5A causes the controller 2 to perform a position registration operation with respect to the new radio zone so that the controller 2 transfers the incoming call for the radio telephone set 5A to the connector 4B and the connector 4B calls the radio telephone set 5A. In the same manner as in the above case, the radio zone of the radio telephone Set 5A may be used as expanded even to a zone other than the radio zone of the connector 4A.

The above radio telephone system, which realizes the expansion of the radio zone under control of the controller 2 managing the positions of the radio telephone sets 5A to 5M, is effective when the number of the radio telephone sets 5A to 5N is larger than the number of the connectors 4A to 4N and complicated control is required; but when the number of the radio telephone sets is smaller than the number of the connectors 4A to 4N, the system has a problem that the system is not economical because many of the functions of the controller 2 become useless.

SUMMARY OF THE INVENTION

It is an object of the present invention to provide a radio telephone system which can expand a radio zone with an economical arrangement and also to provide a method of controlling the system.

Another object cf the present invention is to provide a radio telephone system which is suitable in such applications as in pastures and golf courses where a relatively small number of radio telephone sets are used to cover a wide communication area with low communication traffic, and also to provide a method of controlling the system.

A further object of the present invention is to provide a radio communication system which allows easy position registration.

Yet another object of the present invention is to provide a radio telephone system in which position registration can be carried out not only at a radio telephone set side but also at a base station side.

Yet a further object of the present invention is to provide a radio telephone system in which a radio zone can be arbitrarily expanded or reduced.

Still another object of the present invention is to provide a radio telephone system which can call a radio telephone set even when no position registration is previously performed in a base station or even when no response to the incoming-call operation at the base station is returned from the radio telephone set, and also to provide a control method thereof.

A still further object of the present invention is to provide a radio telephone system which requires only a low consumption current.

An additional object of the present invention is to provide a radio telephone system which can issue a voice response, and also to provide a control method thereof.

In accordance with the present invention, the above objects can be attained by providing a radio telephone system which comprises plurality of base stations commonly connected to a wired line and at least one radio telephone set and wherein, when position registration for the radio telephone set is carried out for any of the base stations and when the system receives an incoming call from the wired line, a radio communication circuit is established between the radio telephone set and the base station subjected to the position registration.

The position registration may be realized by depressing a specific key provided to the radio telephone set or by operating a keyboard or the like provided to a specific one of the base stations.

Further, the base stations may be respectively removably connected so that the radio zone of the system can be arbitrarily expanded or reduced as necessary.

According to another aspect of the present invention, when a predetermined time elapses after a base station sends out an incoming call signal but the base station still fails to receive an incoming-call answering signal, or when position registration is not carried out for any of the base stations, the base station generates a paging signal to cause the radio telephone set to be called sequentially from the respective base stations.

For the purpose of electric power saving, the system is configured in a manner that one of the base stations not subjected to the position registration turned OFF at least the power of the transceiver provided therein.

In the present invention, when the system issues a calling signal in a radio telephone set calling mode but fails to receive a call answering signal, the system informs the caller of the call failure in the form of a voice signal.

DESCRIPTION OF THE PREFERRED EMBODIMENTS

Figure 1:
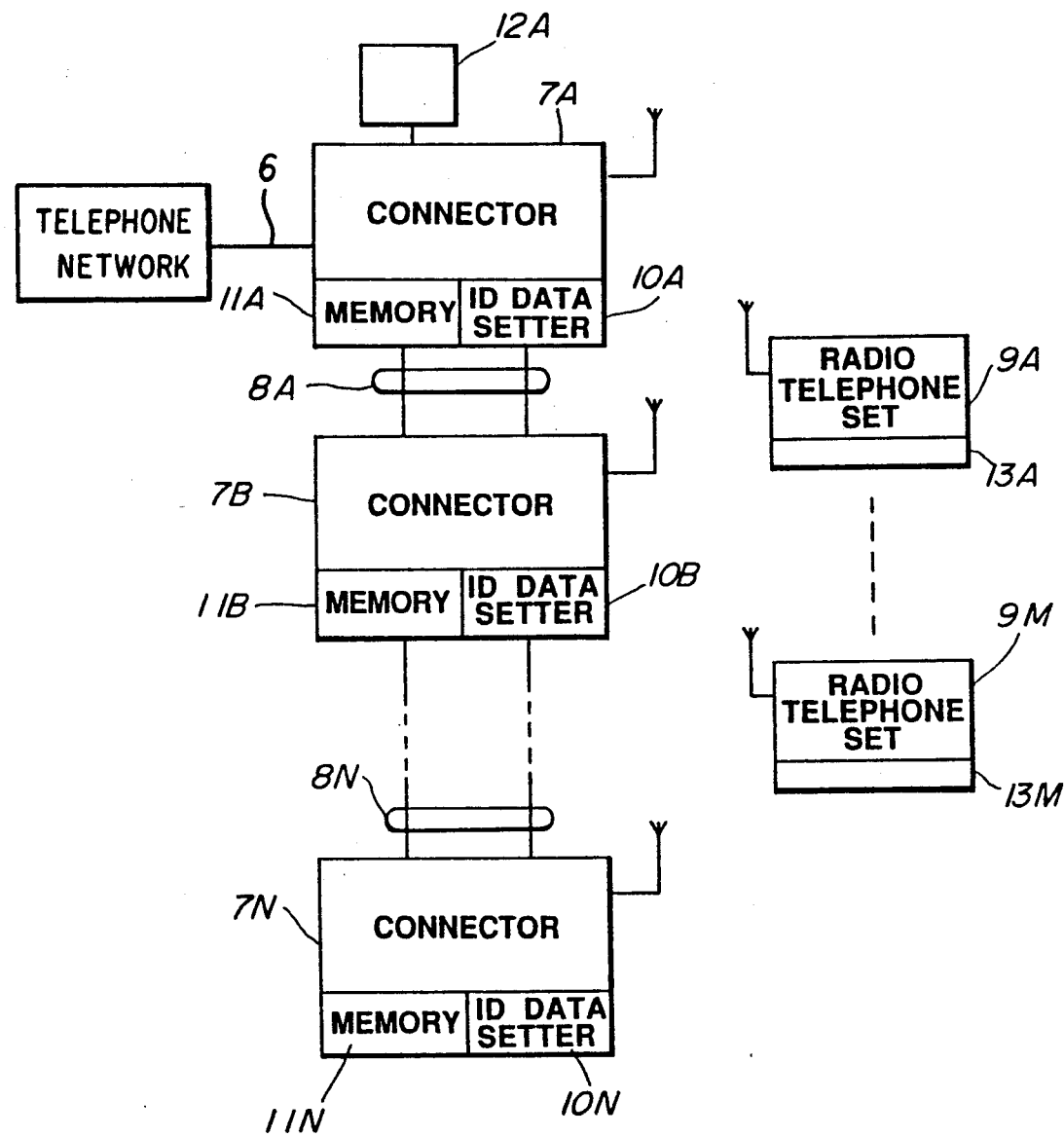
FIG. 1 is a block diagram showing an embodiment of a radio telephone system of the present invention.

Referring to FIG. 1, there is shown a block diagram of an embodiment in accordance with the present invention, in which N of base stations 7A to 7N are connected in parallel with a single wired telephone line 6 via connection cables 8A to 8N and M (N>M) of radio telephone sets 9A to 9M are provided.

The base stations 7A to 7N are provided therein with memories 11A to 11N for storing therein identification data, respectively. When no registration of any of the radio telephone sets is carried out, only a system identification data (system ID) common to the base stations 7A to 7N is stored in the memories 11A to 11N. The base stations 7A to 7N also include identification data setting circuits 10A to 10N respectively. The circuits 10A to 10N, When the radio telephone sets 9A to 9M to be registered are mounted on the base stations 7A to 7N, have respectively a function of reading individual identification data (individual IDs) allocated to the respective radio telephone sets and of storing the individual IDs into their memories 11A to 11N together with the system ID and also of transferring them to other base stations. The identification data setting circuits 10A to 10N also have respectively a function of checking whether or not individual IDs sent from other base stations through the connection cables 8A to 8N are already stored in the respective memories and if so, of erasing them.

Figure 2:
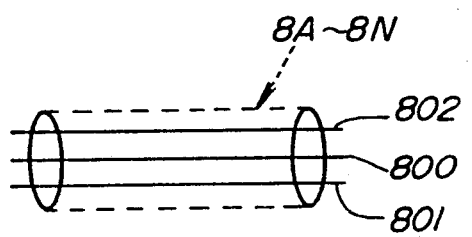
FIG. 2 shows details of a connection cable used in the same embodiment.

Meanwhile, each of the connection cables 8A to 8N contains, as shown in FIG. 2, three signal lines, that is, a wired telephone line 800, a power line 801 and an identification data line 802, the lines 800 to 802 being connected in parallel with the respective base stations 7A to 7N.

Figure 3:
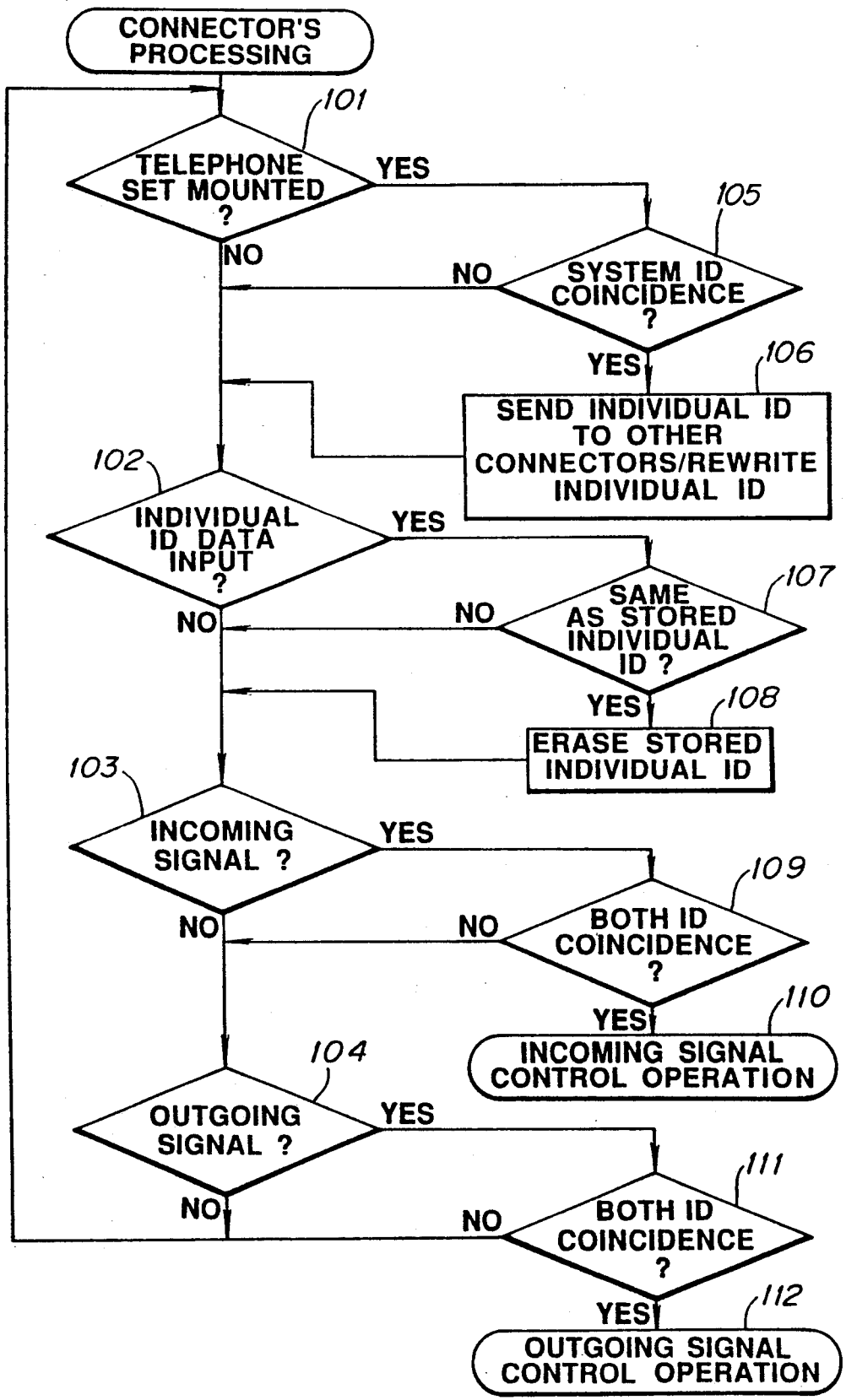
FIG. 3 is a flowchart for explaining the operation of the same embodiment.

FIG. 3 shows a flowchart showing the individual ID control and incoming/outgoing call control in the base stations 7A to 7N. Explanation will next be made as to the operation of the embodiment of FIG. 1 by referring to this flowchart.

First, since the memories 11A to 11N of the base stations 7A to 7N store therein only the system ID respectively, the base stations 11A to 11N repetitively check (1) whether radio telephone sets have been mounted on desired base stations, (2) whether the individual IDs have been input, (3) whether they have received an incoming call, and (4) whether they have received an outgoing call (steps 101 to 104). Under such a condition, for example, when the radio telephone set 9A is mounted on the base station 7A in order to move the radio zone of the radio station set 9A to that of the base station 7A, the base station 7A reads the system ID and individual ID already registered in the radio telephone set 9A from a memory (not shown) of the telephone set 9A to check whether or not the read system ID coincides with the system ID of the base station 7A (step 105). When the read system ID does not coincide with the system ID of the base station 7A, this means that the radio telephone set 9A is for another system. Accordingly, the program goes to the step 102 without any processing. When the base station 7A finds a system ID coincidence, the base station 7A stores the read system ID and the individual ID in the memory 11A and then sends the individual ID to the other base stations 7B and 7N through the connection cables 8A to 8N (step 106). The base stations 7B to 7N, when receiving the individual ID from the base station 7A, shifts its processing from the step 102 to a step 107 to check whether the received individual ID is the same as the individual ID already stored therein (step 107). When the base stations 7B to 7N determine that the received individual ID is the same as that already stored therein, they erase the already stored individual ID (step 108). If any individual IDs are not previously stored in the base stations, then the stations ignore the received individual ID.

At this stage, for example, when the radio telephone set 9A is previously registered for the radio zone of the base station 7B, the individual ID of the radio telephone set 9A is erased from the memory 11B of the base station 7B and newly registered for the station 7A. As a result, a new pair of the base station and radio telephone set 7A and 9A is determined.

In this manner, the respective radio telephone sets are registered for the respective base stations 7A to 7N. However, at the time of issuing an outgoing call or receiving an incoming call, only the registered radio telephone set must be able to issue an outgoing call and receive an incoming call. To this end, in the incoming call reception mode, only when the system finds coincidence in both of the system ID and individual ID contained in an answering signal from the radio telephone set intended for the incoming call, the system advances its incoming-call control procedure (steps 109 and 110).

In the outgoing call issuance mode, only when the system finds coincidence in both of the system ID and individual ID contained in an outgoing call signal, the system advances its outgoing call control procedure (steps 111 and 112).

In this way, in the present invention, position registration is carried out by mounting the radio telephone sets 9A to 9M on the base stations 7A to 7N having different radio zones in place of the prior art radio-telephone-set position registration operation. Thus, the radio zones of the radio telephone sets 9A to 9M can be freely expanded without provision of any expensive controller having multiple functions.

Although the above explanation has been made as to the case where the individual IDs are directly read from the memories of the radio telephone sets 9A to 9M, such an arrangement may be possible that the base stations 7A to 7N are provided with associated switches so that the operation of a desired one of these switches causes the generation of the associated individual ID which is stored in an associated one of the memories 11A to 11N and also sent to the other base stations 7A to 7N.

As another example, such an arrangement may also be possible that a specific one, for example, 7A of the base stations 7A to 7N is provided with a keyboard 12A as shown in FIG. 1 so that the operation of the keyboard causes the respective radio telephone sets 9A to 9M to be registered for the base stations 7A to 7N.

Also possible is such an arrangement that the individual IDs are transmitted from the radio telephone sets 9A to 9M to the base stations 7A to 7N through unique radio communication circuits, so long as the electromagnetic waves of the individual IDs to be transmitted are not subjected to any mutual interference. In this case, as shown in FIG. 1, the radio telephone sets 9A to 9M are provided with a plurality of keys 13A to 13N corresponding to the base stations 7A to 7N so that the depression of desired one of the keys causes the realization of desired position registration.

For the purpose of saving electric power, the system is configured in a manner that the base stations not subjected to the position registration may be arranged to turn OFF at least the power of the transceiver provided therein.

The base stations are removably interconnected by means of connectors not shown so that the number of the base stations can be arbitrarily set. This arrangement enables the desired expansion or reduction of the radio zone of the system.

Figure 4:
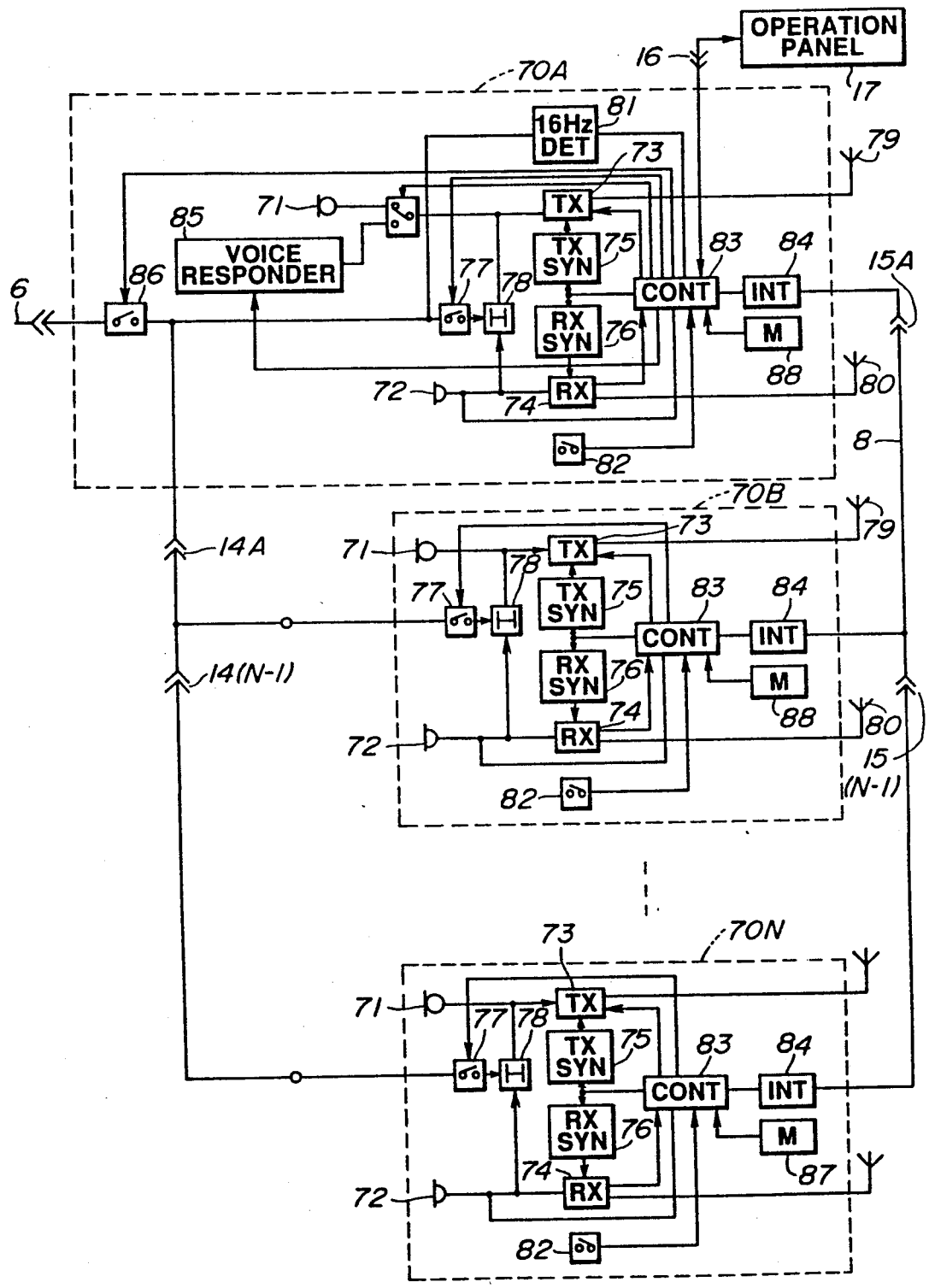
FIG. 4 is a block diagram showing another embodiment of the radio telephone system of the present invention.

Shown in FIG. 4 is another embodiment of the present invention, in which N of base stations 70A to 70N are connected to a single wired telephone line 6. Among these base stations, the base station 70A works as a main base station and the other base stations 70B to 70N are controlled by the main base station 70A.

Each of the base stations 70A to 70N has a microphone 71 as a telephone receiver and a loudspeaker 72 as a telephone transmitter, through which a speech (extension speech) can be realized between the base stations and between the base stations and radio telephone sets.

Explanation will first be made as to the arrangement of the main base station 70A.

The main base station 70A, which is connected directly to the wired telephone line 6 through a switch 86 provided therein, also has a transmitter 73 and a receiver 74. The transmission signal frequency transmission channel) is controlled by a transmission synthesizer 75, while the reception signal frequency of the receiver 74 (reception channel) is controlled by a reception synthesizer 76.

In more detail, the transmitter 73 receives a voice signal sent from the microphone 71 through a switch 87A or receives a signal sent from the wired telephone line 6 through switches 86 and 77 and a hybrid circuit 78, puts the received signal on a carrier of a predetermined frequency controlled by the transmission synthesizer 75, and transmits it from an antenna 79.

The receiver 74, on the other hand, extracts only a signal carried on a carrier of a predetermined frequency controlled by the reception synthesizer 76 from signals received at an antenna 80, and sends the extracted signal to the telephone transmitter 72 or through the hybrid circuit 78 and the switches 77 and 86 to the wired telephone line 6.

An incoming-call detecting circuit 81 detects an incoming call signal of 16 Hz from the wired telephone line 6, and a calling switch 82 is used to give an outgoing call.

A control circuit 83 functions to control the general operation of the main base station 70A. More specifically, the control circuit 83 controls the transmission synthesizer 75 and the reception synthesizer 76 to determine the transmission frequency and the reception frequency respectively. The controller 83 also sends out predetermined control data through the transmitter 73 and receives predetermined control data received through the receiver 74 to perform various control operations. The controller 83 also receives a detection output of the incoming-call detector 81 and correspondingly controls the switch 77. The controller also receives an output of the calling switch 82, performs the necessary calling operation and as necessary, drives the loudspeaker 72 to generate a necessary ringing tone.

In an extension speech mode, the control circuit 83 causes the switch 86 to be turned OFF so that the main base station 7A is disconnected from the wired telephone line 7.

When it is desired to perform an automatic voice response, the control circuit 83 causes the switch 87A to be shifted to its position leading to a voice responder 85.

The voice responder 85, which is controlled by a control circuit 83, sends a necessary voice signal to the wired telephone line 6 via the switch 87, hybrid circuit 78 and switches 77 and 86.

A memory 88 stores therein various control data including an ID code.

The main base station 70A is connected through a connector 16 to an operational panel 17 so that the position registration of radio telephone sets can be carried out for any of the base stations by means of the operational panel 17.

The sub base stations 70B to 70N are constructed by removing the voice responder 85 and switches 86 and 85 from the arrangement of the main base station 70A. Other arrangement is substantially the same as the main base station 70A.

The base stations 70A to 70N are removably interconnected by means of connectors 14A, 15A, ..., 14(N−1) and 15(N−1) respectively. In other words, at least the sub base stations 70B to 70N are arranged as optional devices, that is, the number of such stations can be arbitrarily increased or decreased as necessary.

Figure 5:
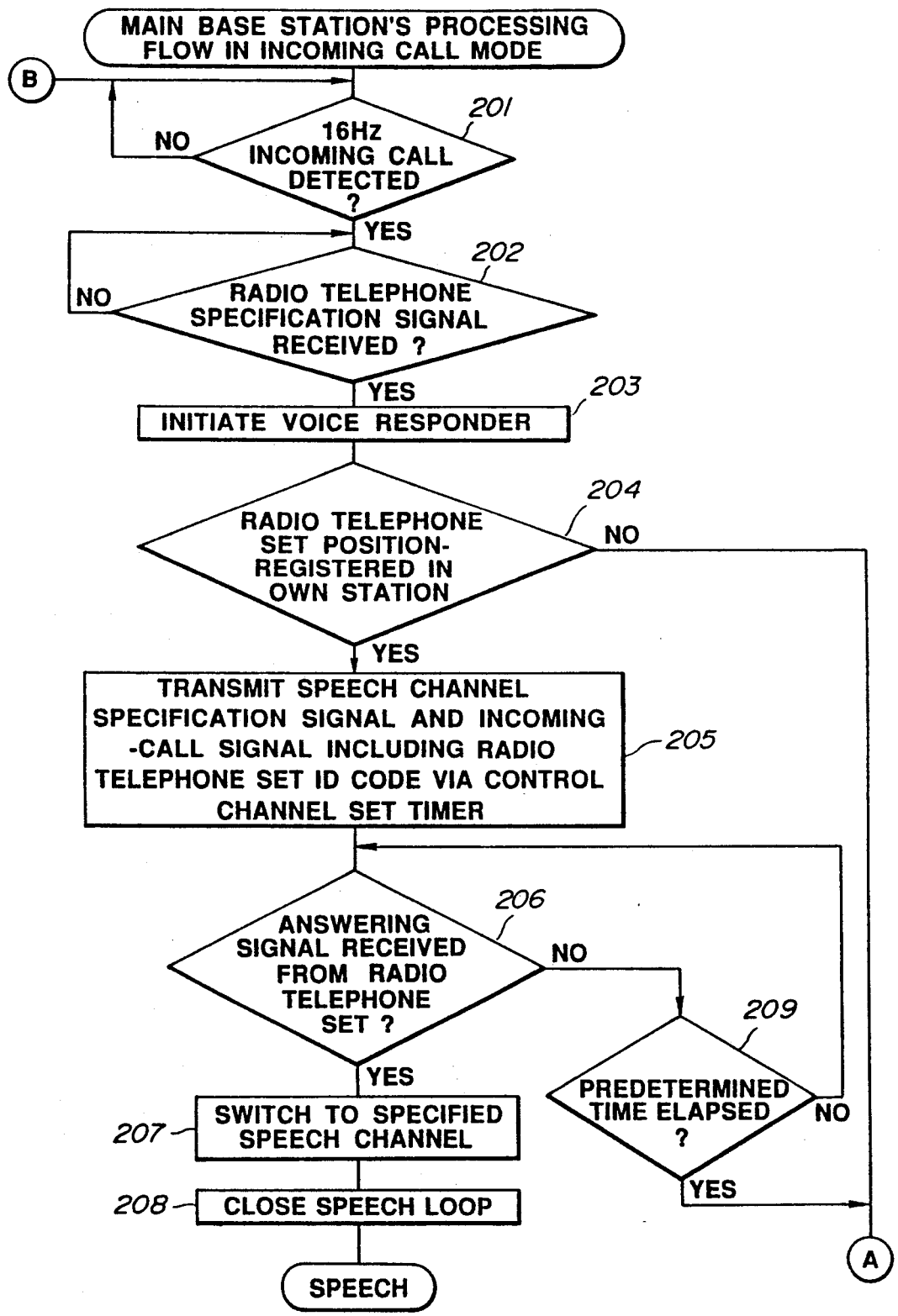
FIGS. 5, 6 and 9 show a flowchart for explaining the operation of the same embodiment.
Figure 6:
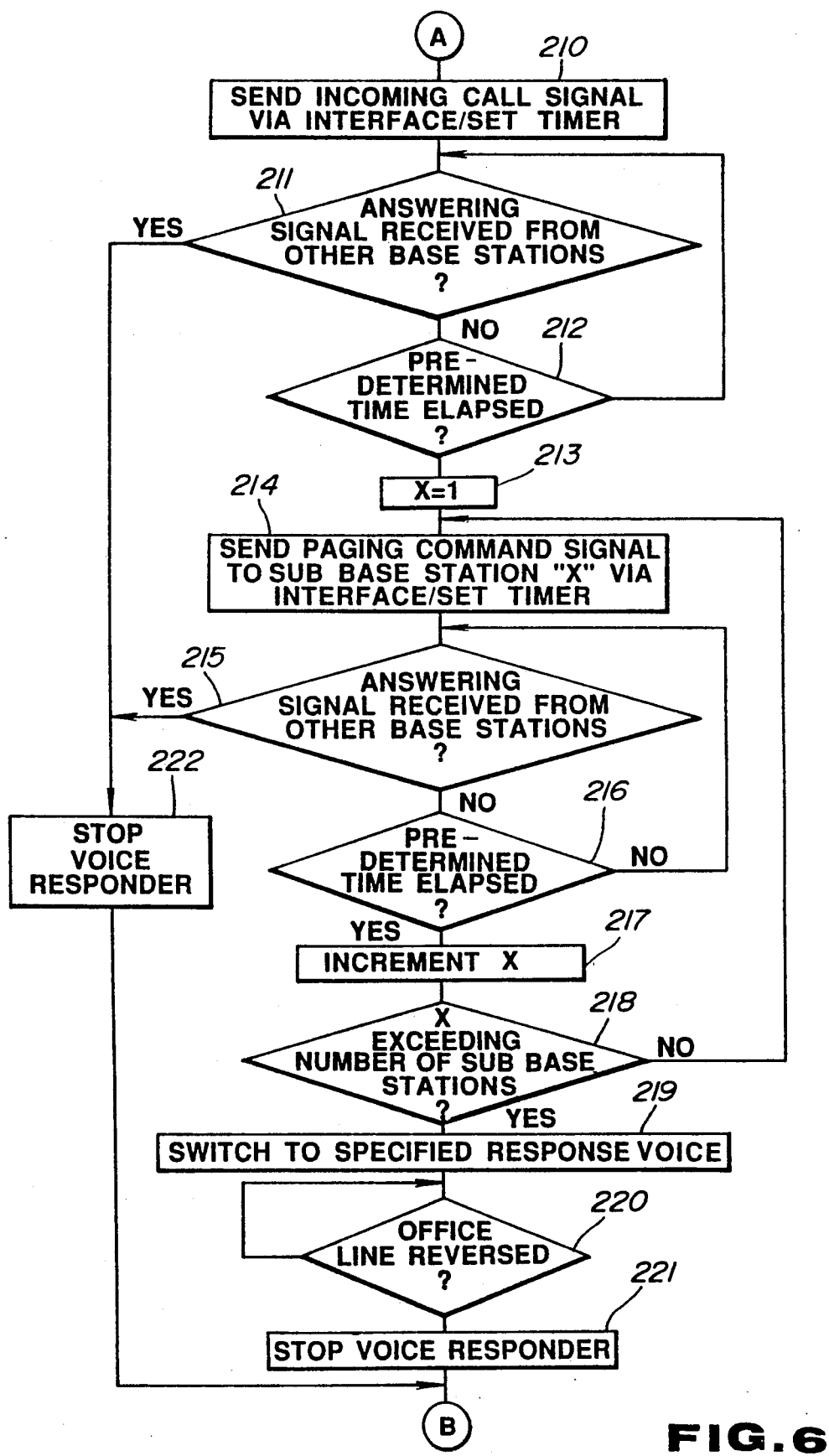
Figure 9:
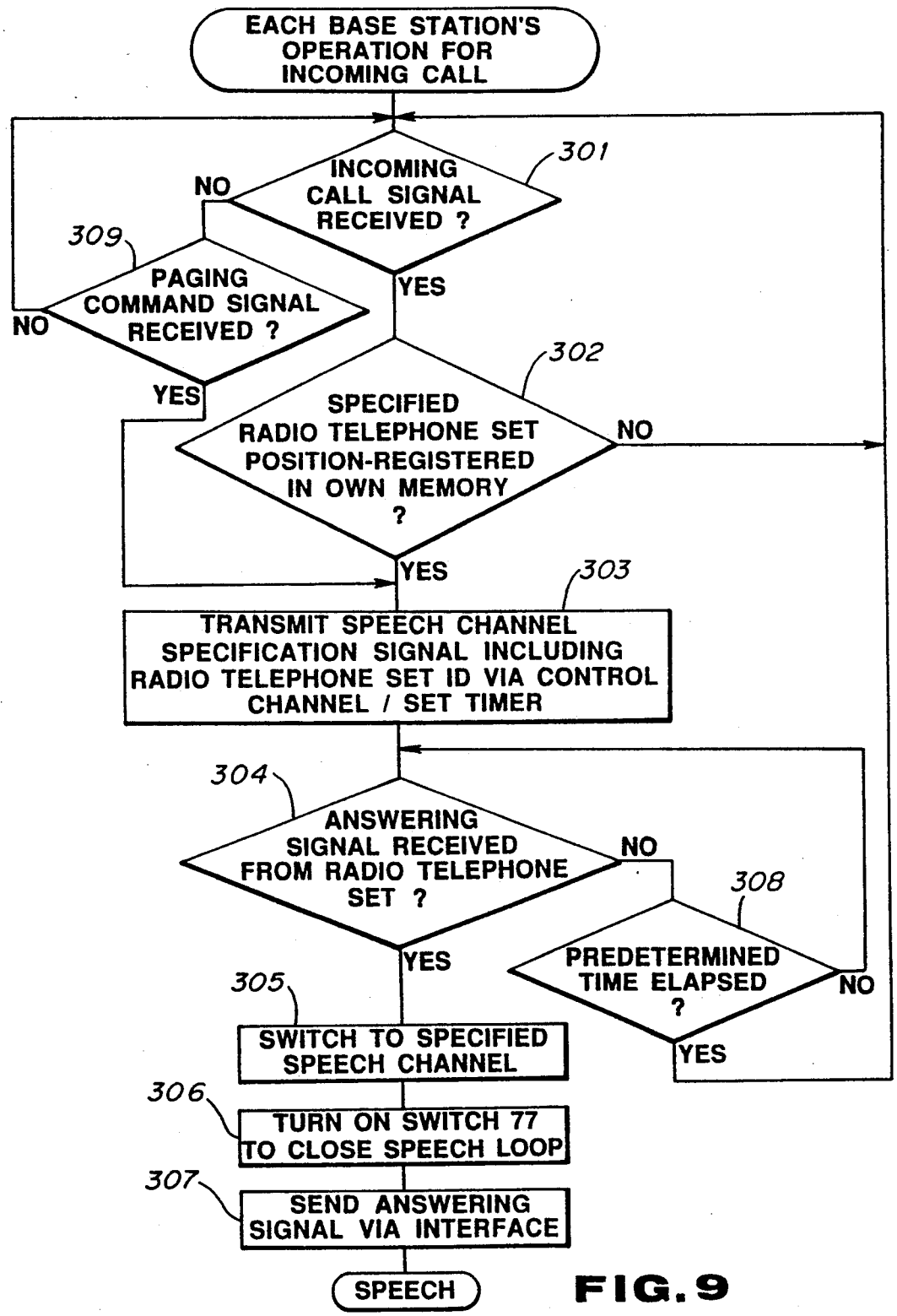

The major operation of the present invention will be detailed by referring to a flowchart showing FIGS. 5, 6 and 9. More concretely, FIGS. 5 and 6 show the operation of the main station 70A and FIG. 9 shows the operation of the sub base station 70B to 70N.

Referring to FIGS. 5 and 6, when an incoming call signal of 16 Hz arrives at the wired telephone line 6 and the reception of the incoming call signal is detected on the basis of the output of the incoming-call detector 81 (step 201), the main base station 70A next checks whether it has received a telephone set specification signal (Step 202). The telephone set specification signal is generated by a secondary dial provided at the caller side. Assume, for example, that the telephone number of this system is "03-456-0001". Then such a telephone set specification signal is generated by dialing the telephone number and then by dialing "#10" specifying a desired telephone set.

The reception of the telephone set specification signal causes the voice responder 85 to be activated (step 203) so that the voice responder 85 issues a voice signal saying, for example, "NOW, PAGING THE PARTY IN THE PASTURE. PLEASE, WAIT A MINUTE" and the voice signal is sent through the wired telephone line 6 back to the caller.

Then, the main base station checks whether the position registration of the telephone set specified by the telephone set identification signal is already made in the main base station (step 204). The position registration of a radio telephone set may be performed by broadcasting an identification signal of its own in advance by inputting the identification number into a desired base station at operation panel 17. The main base station, when determining the specified telephone set is already registered therein, i.e., the identification number of the specified telephone set is stored in the main base station, transmits a speech channel specification signal and the incoming-call signal including the ID code of the telephone Set through the control channel to the telephone set and sets a timer (step 205).

Under such a condition, the main base station waits for an answering signal from the telephone set. When the main base station receives the answering signal from the telephone set prior to the passage of a predetermined time after the setting of the above timer (step 206), the station switches the current speech channel to the speech channel specified by the above speech channel specification signal (step 207), turns ON the switch 77, closes the speech loop of the wired telephone line 6 (step 208), thus putting the system in the speech enable mode.

If the specified telephone set is not registered in the main base station 70A (step 204) or if the main base station fails to receive the answering signal from the radio telephone set even after passage of the predetermined time (step 207), then the main base station sends the incoming-call signal onto a signal line 8 through an interface 84 and sets the timer (step 210).

Figure 7:
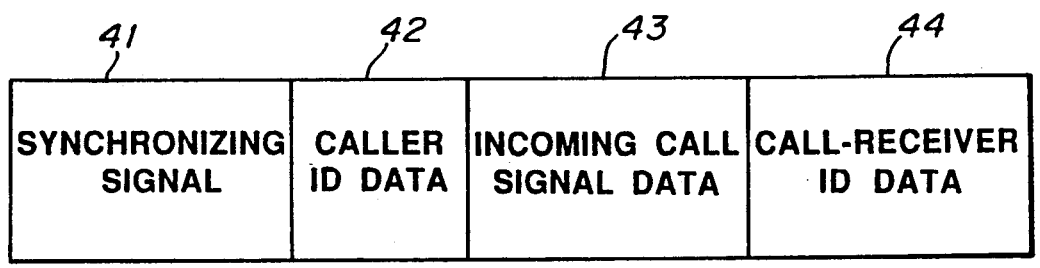
FIGS. 7 and 8 are exemplary data formats of an incoming call signal and a paging command signal used in the same embodiment, respectively.

Shown in FIG. 7 is an example of the format of the above incoming-call signal. More specifically, the incoming-call signal is constituted, as shown in FIG. 7, of a synchronizing signal 41, a caller identification data 42 for identification of the caller, an incoming call data 43 indicative of the presence of an incoming call, and a call-receiver identification data 44 for identification of the call receiver.

Referring to FIG. 9, the sub base stations 70B to 70N are monitoring the above incoming-call signal from the main base station 70A via the signal line 8. The sub base stations, when receiving the incoming-call signal from the main base station 70A (Step 301), checks whether or not the call-receiver identification data (the ID Code of the telephone set) contained in the incoming-call signal is position-registered in their own stations, that is, whether or not the specified telephone set is position-registered in their own memories (step 302).

When one of the sub base stations finds the position registration in its own memory, the corresponding sub base station transmits the speech channel specification signal and the incoming call signal including the ID code of the telephone Set and sets its timer (step 303).

Under such a condition, the sub base station waits for an answering signal from the radio telephone set. When the sub base station receives the answering signal from the radio telephone set prior to the passage of a predetermined time after the setting of the above timer (step 304), the station switches the current speech channel to the speech channel specified by the above speech channel specification signal (step 305), turns ON the switch 77, closes the speech loop of the wired telephone line 6 (step 306), sends out the answering signal onto the signal line 8 via the interface 84 (step 307), after which the system is put in the speech mode.

Referring again to FIG. 6, the main base station 70A is monitoring the answering signal from the above sub base station through the signal line 8. The main base station 70A, when receiving the answering signal from the sub base station (step 211) within the predetermined time after the sending of the incoming call signal (step 212), stops the operation of the voice responder 85, after which the system is returned to the initial condition of the flowchart of FIG. 6.

The present embodiment is arranged so that, when the main base station fails to receive the answering signal from the sub base station within the predetermined time after the sending the incoming call signal, the main station sends a paging signal sequentially to the sub base stations 70B to 70N to call the desired radio telephone set.

More specifically, the main station fails to receive the answering signal from the sub base stations even after the passage of the predetermined time, it sets a value X indicative of a sub base station to be "1" (step 213), sends a paging command signal to the sub base station corresponding to the value X through the interface 84 and sets the timer (step 214).

Figure 8:
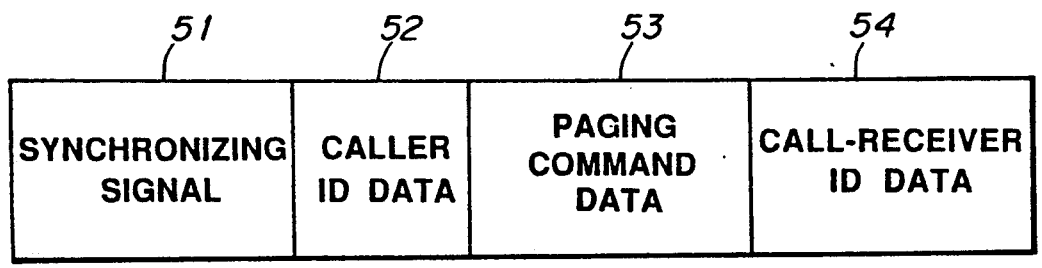

The format of the above paging command signal is shown, as an example, in FIG. 8. More in detail, the paging command signal comprises, as shown in FIG. 8, a synchronizing signal 51, a caller identification data 52 for identification of the caller, a paging command data 53 indicative of the paging command signal, and a call-receiver identification data 54 (the ID code of the telephone set) for identification of the call receiver.

Referring to FIG. 9, the sub base station, when receiving the paging command signal (step 309), transmits to the radio telephone set the speech channel specification signal and the incoming call signal including the ID code of the radio telephone set and sets the timer (step 303). Under such a condition, the sub base station awaits an answering signal from the radio telephone set. When the sub base station receives the answering signal from the radio telephone set before passage of the predetermined time after the setting of the timer (step 304), it switches the current speech channel to the one specified by the above speech channel specification signal (step 305), turns ON the switch 77 to close the speech loop of the wired telephone line 6 (step 306), sends out the answering signal onto the signal line 8 through the interface 84 (step 307), after which the system is put in the speech mode.

Referring again to FIG. 6, the main base station 70A, when receiving the answering signal from the base station corresponding to the value X, stops the operation of the voice responder 85 (step 222) and the system is returned to the initial state of the flowchart of FIG. 6.

If, even after passage of the predetermined time (step 216), the main base station fails to receive the answering signal from the base station of the value X, then the main station increases the value X by "1" to "2" (step 217) and checks whether or not the value X exceeds the number of the sub base stations (in this embodiment, the number being "N−1") (step 218).

If the main base station determines NO at the step 218, then the system is returned to the step 214 where the main station transmits the paging command signal toward the sub base station corresponding to the value X (=2).

And the main base station monitors the reception of the answering signal from the sub base station indicative of the value X (=2) (step 215). Even the predetermined time after the sending of the paging command signal, if the main base station fails to receive the answering signal, then it increases the value X further by "1" and repeats the same operations as mentioned above.

Through such repetitive operation, when the main base station receives the answering signal from the sub base station to which the paging command signal has been issued, the main station goes to the step 222 where the processings of the flowchart of FIG. 6 are completed. If the value X exceeds the number of the sub base stations (step 218), however, then the main base station switches the voice responder from its current response voice to another response voice saying, for example, "PAGED THE PARTY IN THE PASTURE, BUT NO ANSWER FROM THE SPECIFIED TELEPHONE SET" (step 219), reverses the polarities of the office line (step 220), stops the operation of the voice responder 85 (step 221) to put the system in a conversation failure mode. At this stage the processing of the flowchart of FIG. 6 is completed.

Figure 10:
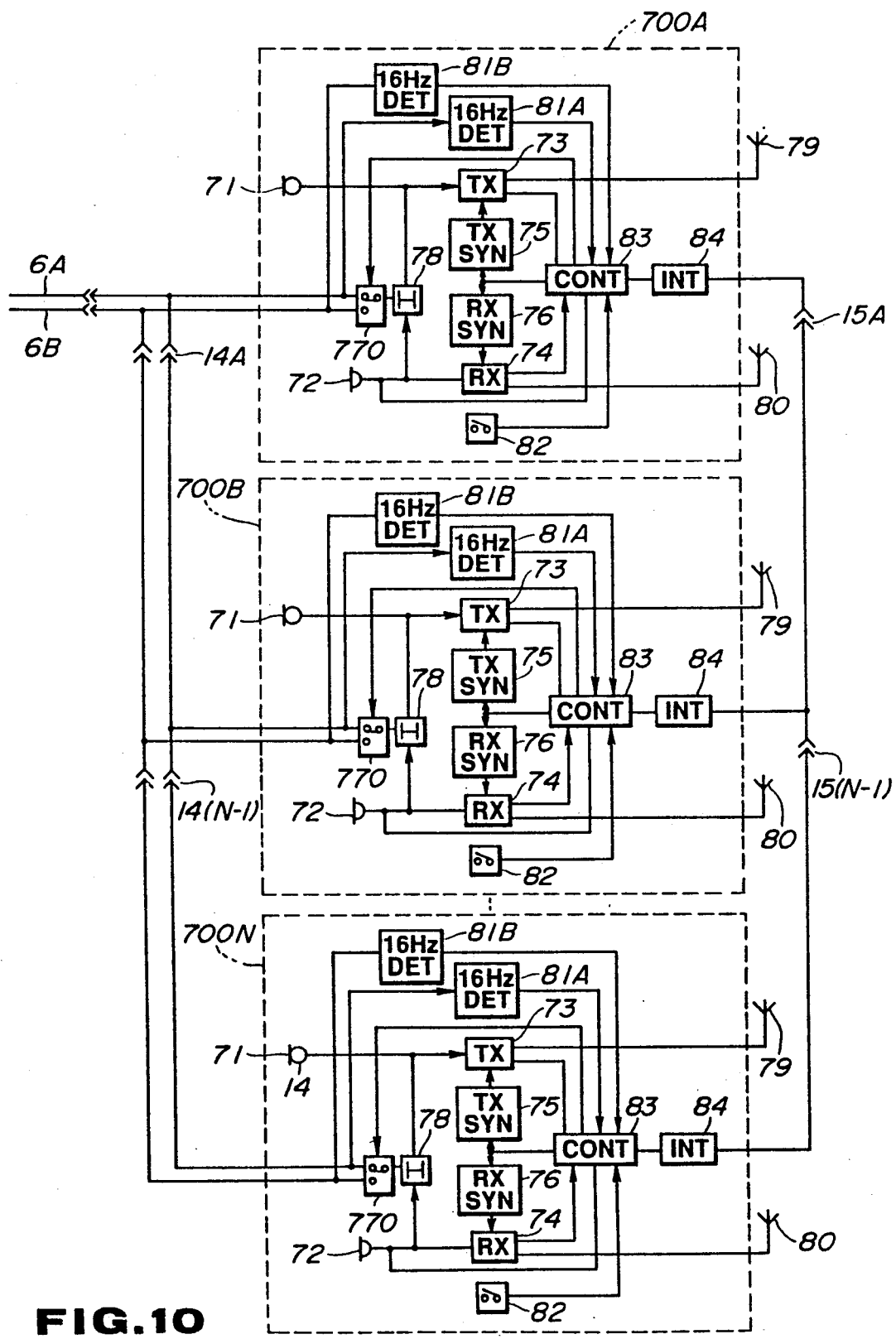
FIG. 10 is a block diagram showing a further embodiment of the radio telephone system of the present invention.

There is shown further embodiment of the present invention in FIG. 10, in which N of base stations 700A to 700N are commonly connected to two wired telephone lines 6A and 6B in an equivalent relation thereto.

In the present embodiment, the base stations 700A to 700B have respectively an identical circuit configuration and fundamentally the same as the main base station 70A shown in FIG. 4. In the present embodiment of FIG. 10, however, because of the base stations connected to the two wired telephone lines 6A and 6B, the switch 77 in FIG. 4 is replaced by a change-over switch 770 in FIG. 10 and the incoming call detecting circuit 81 is replaced by incoming call detecting circuits 81A and 81B connected to the respective wired telephone lines 6A and 6B in FIG. 10. That is, when the system receives an incoming call from one of the wired telephone lines, the control circuit 83 controls the switching operation of the change-over switch 770 on the basis of the outputs of the incoming call detectors 81A and 81B.

When an incoming call is detected by either of incoming call detecting circuit 81A or 81B at each base station 700A to 700N, a detection signal is sent to the respective control circuit 83. Each control circuit 83 controls change-over switch 770 so that the wired telephone line through which the incoming call is transmitted is connected to hybrid circuit 78 and controls transmission synthesizer 75 and transmitter 73 so that an incoming call (paging) signal is broadcast from the antenna 79 over the control channel. The paging signal includes a speech channel resignation signal and may include an identification signal. The identification signal may correspond to a telephone number which is assigned to the wired telephone line or to an identification number which is uniquely assigned to a radio telephone set.

If a radio telephone set receives the paging signal including an identification signal to which the radio telephone set should respond, it alarms a user of the radio telephone set by generating a prescribed tone signal. When the user responds to the alarm by operating a hook switch, the radio telephone set sends a response signal over the control channel and changes the communication channel to the speech channel designated by the speech channel designation signal from the control channel. Responsive to a reception of the response signal a base station, for example, 700B also changes the communication channel to the speech channel from the control channel and thereby a communication link is established between the radio telephone Set and the wired line. Simultaneously control circuit 83 of the base station 700B sends a lease signal via interface circuit 84 through the bus line 8 to the other base stations. Responsive to a reception of the release signal, control circuits 83 of the other base stations control change-over switch 770 so that the wired telephone line is disconnected from the hybrid circuit 770.

The system of the embodiment of FIG. 10 is advantageous in that, when the system receives an incoming call, the System is operated so as to call all the base stations and thus the speech channel setting speed can be made fast. Furthermore, according to the embodiment, position registration procedure may be omitted.

Figure 11:
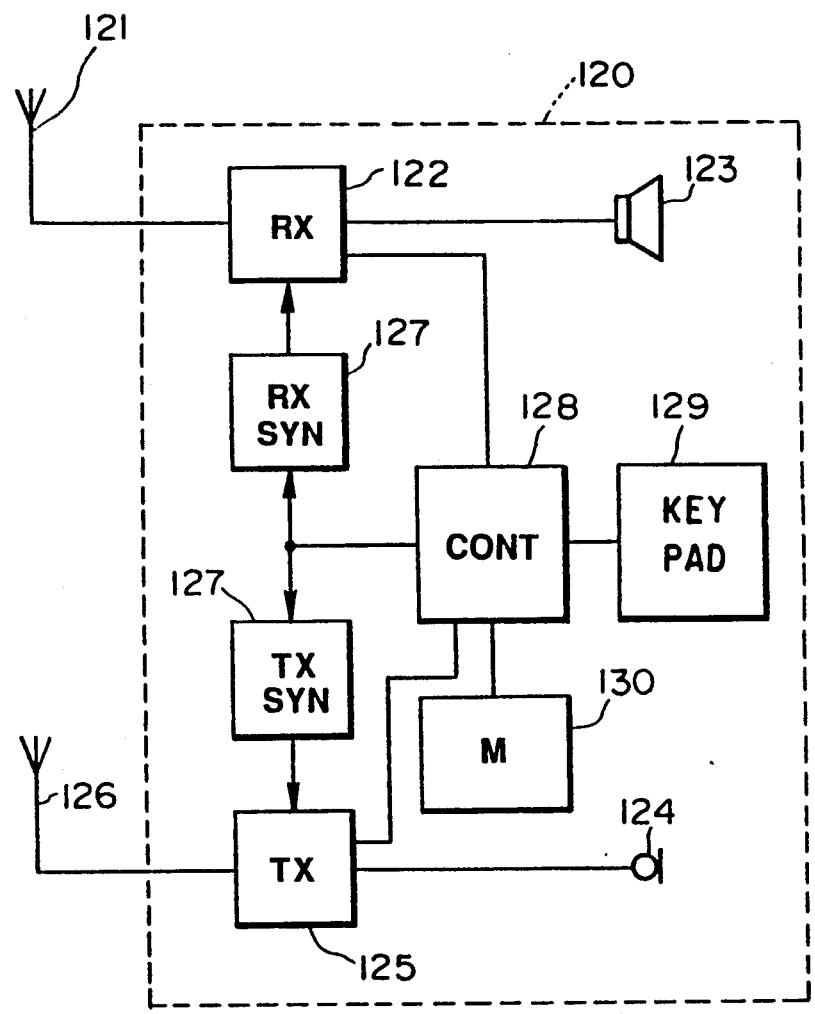
FIG. 11 is an exemplary schematic arrangement of a radio telephone set used in the arrangement of FIG. 10.
Figure 12:
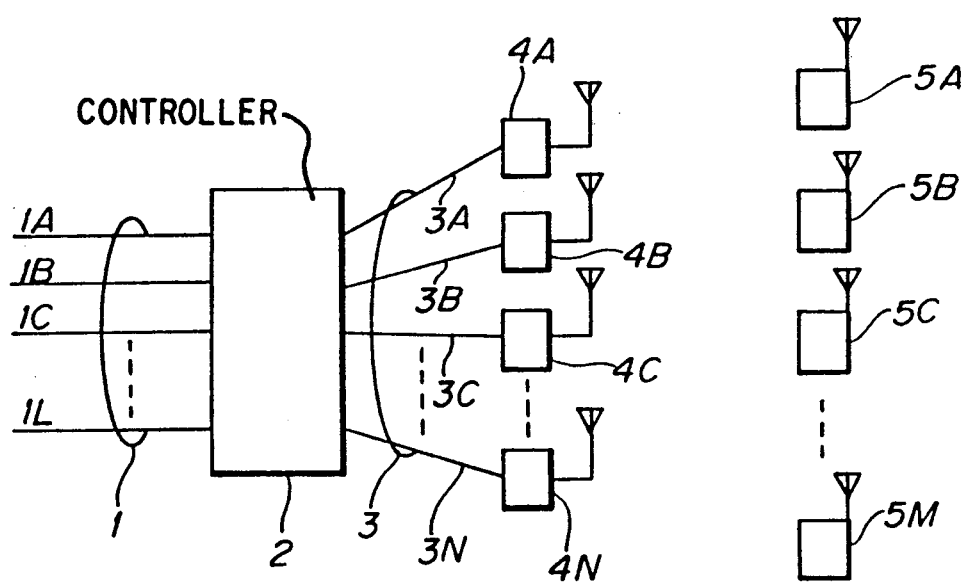
FIG. 12 is a block diagram showing an exemplary prior art radio telephone system.

FIG. 11 shows an exemplary schematic arrangement of a radio telephone set used in the arrangement of FIG. 10. In FIG. 11, a radio telephone set 120 comprises a receiver 122 for receiving a signal from an antenna 121, a loud speaker 123 as a handset receiver driven by a voice signal received at the receiver 122, a microphone 124 as a handset transmitter, a transmitter 125 for transmitting a signal inputted through the microphone 124 over an antenna 126, a receiver synthesizer 127 for controlling the reception channel frequency of the receiver 122, a transmitter synthesizer 127 for controlling the transmission channel frequency of the transmitter 125, a control circuit 128 for controlling the entire operation of the radio telephone set 120, a key pad 129 including a dial key and other control keys, and a memory 130 for storing an ID code and other various sorts of control information. The radio telephone set 120 receives at the antenna 121 and the receiver 122 a signal from the base station, while transmits a signal from the transmitter 125 via the antenna 126 to the base station. The radio telephone set 120 may be of one of various known arrangements.

What is claimed is:

1. A radio telephone system comprising:
    a plurality of base stations, one of which being connected to one wired line which is connected between the radio telephone system and a telephone network, each of said base stations covering a different radio zone respectively, and being sequentially connected to a preceding base station such that a communication path is provided from each base station to said one wired line through said preceding base station;
    at least one radio telephone set;
    position registering means for registering a position of said at least one radio telephone set with respect to one of said plurality of base stations to establish a position-registered base station for said at least one radio telephone set; and radio communication linking means for establishing a radio communications link between said position-registered base station and said at least one radio telephone set when said system receives an incoming call on said wire line, wherein said position registering means includes external input means provided to a specific one of said plurality of base stations, and the position registration of said at least one radio telephone set is carried out through input from said external input means.

2. A radio telephone system comprising:

a plurality of base stations, one of which being connected to one wired line which is connected between the radio telephone system and a telephone network, each of said base stations covering a different radio zone respectively, and being sequentially connected to a preceding base station such that a communication path is provided from each base station to said one wired line through said preceding base station;

at least one radio telephone set;

position registering means for registering a position of said at least one radio telephone set with respect to one of said plurality of base stations to establish a position-registered base station for said at least one radio telephone set; and radio communication linking means for establishing a radio communications link between said position-registered base station and said at least one radio telephone set when said system receives an incoming call on said wire line, wherein said position registering means includes external input means provided to said at least one radio telephone set, and the position registration of said at least one radio telephone set is carried out through input from said external input means through a radio communication.

3. A radio telephone system comprising:

a main base station connected to a wired line and covering a predetermined radio zone;

a plurality of sub base stations, one of which being connected to said main base station, each of said sub base stations covering a different radio zone which is different from the predetermined radio zone covered by said main station, and being sequentially connected to a preceding sub base station such that a communication path is provided from each sub base station to said main base station through said preceding sub base station;

at least one radio telephone set;

position registering means for registering a position of said at least one radio telephone set with respect to one of said main and sub base stations to establish a position-registered base station for said at least one radio telephone set; and radio communication linking means for establishing a radio communications link between said position-registered base station and said at least one radio telephone set when said system receives an incoming call on said wired line, wherein said position registering means includes external input means provided to said main base station, and the position registration of said at least one radio telephone set is carried out through input from said external input means.

4. A radio telephone system, comprising:

a main base station connected to a wired line and covering a predetermined radio zone;

a plurality of sub base stations, one of which being connected to said main base station, each of said sub base stations covering a different radio zone which is different from the predetermined radio zone covered by said main station, and being sequentially connected to a preceding sub base station such that a communication path is provided from each sub base station to said main base station through said preceding sub base station;

at least one radio telephone set;

position registering means for registering a position of said at least one radio telephone set with respect to one of said main and sub base stations to establish a position-registered base station for said at least one radio telephone set; and radio communication linking means for establishing a radio communications link between said position-registered base station and said at least one radio telephone set when said system receives an incoming call on said wired line, wherein said position registering means includes external input means provided to said at least one radio telephone set, and the position registration of said at least one radio telephone set is carried out through input from said external input means through a radio communication.

5. The radio telephone system as set forth in claim 4, wherein said external input means includes a plurality of keys corresponding respectively to said main and sub base stations.

6. A radio telephone system comprising:

a plurality of base stations, one of which being connected to one wired line which is connected between the radio telephone system and a telephone network, each of said base stations covering a different radio zone respectively, and being sequentially connected to a preceding base station such that a communication path is provided from each base station to said one wired line through said preceding base station;

at least one radio telephone set;

position registering means for registering a position of said at least one radio telephone set with respect to one of said plurality of base stations to establish a position-registered base station for said at least one radio telephone set;

incoming-call-signal transmitting means for transmitting an incoming call signal to said at least one radio telephone set through said position-registered base station when said system receives an incoming call from said wired line;

radio communication linking means for establishing a radio communications link between said position-registered base station and said at least one radio telephone set;

calling means for calling said at least one radio telephone set sequentially from the other base stations when failing to receive said incoming-call answering signal from said at least one radio telephone set a predetermined time after sending of said incoming call signal from said position-registered base station; and voice responding means for sending to said wired line a voice signal indicative of a state in which said at least one radio telephone set is being called, simultaneously with said transmission of said incoming call signal from said incoming-call-signal transmitting means.

7. A radio telephone system comprising:
a plurality of base stations, one of which being connected to one wired line which is connected between the radio telephone system and a telephone network, each of said base stations covering a different radio zone respectively, and being sequentially connected to a preceding base station such that a communication path is provided from each base station to said one wired line through said preceding base station;
at least one radio telephone set;
position registering means for registering a position of said at least one radio telephone set with respect to one of said plurality of base stations to establish a position-registered base station for said at least one radio telephone set;
incoming-call-signal transmitting means for transmitting an incoming call signal to said at least one radio telephone set through said position-registered base station when said system receives an incoming call from said wired line;
radio communication linking means for establishing a radio communications link between said position-registered base station and said at least one radio telephone set;
calling means for calling said at least one radio telephone set sequentially from the other base stations when failing to receive said incoming-call answering signal from said at least one radio telephone set a predetermined time after sending of said incoming call signal from said position-registered base station; and
voice responding means for sending a voice signal indicative of "no answer" onto said wired line, when said calling means fails to receive an answer from said at least one radio telephone set.

8. A radio telephone system comprising:
a plurality of base stations, one of which being connected to one wired line which is connected between the radio telephone system and a telephone network, each of said base stations covering a different radio zone respectively, and being sequentially connected to a preceding base station such that a communication path is provided from each base station to said one wired line through said preceding base station;
at least one radio telephone set;
position registering means for registering a position of said at least one radio telephone set with respect to one of said plurality of base stations to establish a position-registered base station for said at least one radio telephone set;
incoming-call-signal transmitting means for transmitting an incoming call signal to said at least one radio telephone set through said position-registered base station when said system receives an incoming call from said wired line;
radio communication linking means for establishing a radio communications link between said position-registered base station and said at least one radio telephone set;
calling means for calling said at least one radio telephone set sequentially from the other base stations when failing to receive said incoming-call answering signal from said at least one radio telephone set a predetermined time after sending of said incoming call signal from said position-registered base station; and
first voice responding means for sending a voice signal to said wired line indicative of a state in which said at least one radio telephone set is being called, simultaneously with transmission of said incoming call signal from said incoming-call-signal transmitting means, and further comprising second voice responding means for sending a voice signal indicative of "no answer" onto said wired line, when said calling means fails to receive an answer from said at least one radio telephone set.

9. A method of controlling a radio telephone system including a plurality of base stations, one of which being connected to one wired line which is connected between the radio telephone system and a telephone network, and at least one radio telephone set, each of said base stations covering a different radio zone respectively, and being sequentially connected to a preceding base station such that a communication path is provided from each base station to said one wired line through said preceding base station, said method comprising the steps of:
performing position registration of said at least one radio telephone set with respect to one of said plurality of base stations to establish a position-registered base station for said at least one radio telephone set;
transmitting an incoming call signal to said at least one radio telephone set from said position-registered base station when said system receives an incoming call from said wired line;
establishing a radio communications link between said position-registered base station and said at least one radio telephone set when said position-registered base station receives an incoming call answering signal from said at least one radio telephone set in response to said incoming call signal; and
sending to said wired line a voice signal indicative of a state in which said at least one radio telephone set is being called, simultaneously with transmission of said incoming call signal from said position-registered base station.

10. A method of controlling a radio telephone system including a plurality of base stations, one of which being connected to one wired line which is connected between the radio telephone system and a telephone network, and at least one radio telephone set, each of said base stations covering a different radio zone respectively, and being sequentially connected to a preceding base station such that a communication path is provided from each base station to said one wired line through said preceding base station, said method comprising the steps of:
performing position registration of said at least one radio telephone set with respect to one of said plurality of base stations to establish a position-registered base station for said at least one radio telephone set;
transmitting an incoming call signal to said at least one radio telephone set from said position-registered base station when said system receives an incoming call from said wired line;
establishing a radio communications link between said position-registered base station and said at least one radio telephone set when said position-registered base station receives an incoming call answering signal from said at least one radio telephone set in response to said incoming call signal; and sending a voice signal indicative of "no answer" to said wired line, when said position-registered base station fails to receive an answer from said at least one radio telephone set.

* * * * *